United States Patent
De Nichilo (10) Patent No.: US 6,224,366 B1
(45) Date of Patent: May 1, 2001

(54) ON-LINE THERMOFORMING MACHINE (75) Inventor: Giorgio De Nichilo, Milan (IT)

(73) Assignee: Gam Impianti S.A., Lugano (CH)

( * ) Notice: Subject to any disclaimer, the term of this patent is extended or adjusted under 35 U.S.C. 154(b) by 0 days.

(21) Appl. No.: 09/215,621

(22) Filed: Dec. 17, 1998

(30) Foreign Application Priority Data

Dec. 22, 1997 (IT) ............................................. MI97A2842

(51) Int. Cl.⁷ .................................................. B29C 51/18
(52) U.S. Cl. ...................... 425/384; 425/397; 425/403.1; 425/407
(58) Field of Search ..................................... 425/384, 397, 425/403.1, 407; 219/537; 392/416

(56) References Cited

U.S. PATENT DOCUMENTS

| | | | |
|---|---|---|---|
| 4,475,881 | * | 10/1984 | Borst et al. ............................ 425/397 |
| 5,571,473 | * | 11/1996 | Fujii ..................................... 264/510 |
| 5,619,913 | * | 4/1997 | Padovani .............................. 100/35 |
| 5,778,145 | * | 7/1998 | De Nichilo .......................... 392/416 |
| 5,808,279 | * | 9/1998 | De Nichilo .......................... 219/537 |

* cited by examiner

Primary Examiner—Harold Pyon
Assistant Examiner—Donald Heckenberg
(74) Attorney, Agent, or Firm—Bucknam and Archer (57) ABSTRACT

An improved on-line thermoforming machine comprises at least a loading station (2) for loading a sheet-like plastic material (in plate or coil form), at least a heating station (3), a thermoforming station (4) and a unloading station (5) for unloading the thermoformed plastic material, the heating station (3) being provided with heating ovens which, in their deactuated condition, do not cause any increase of the side size of the machine with respect to the size necessary for the heating operations. With respect to conventional on-line thermoforming machines, the inventive thermoforming machine has the advantage of a width size which is substantially a half of that of the prior machines, thereby the subject thermoforming machine can be easily transported without the need of disassembling the machine and assembling it again at the working place.

1 Claim, 8 Drawing Sheets

ON-LINE THERMOFORMING MACHINE

BACKGROUND OF THE INVENTION

The present invention relates to an improved on-line thermoforming machine.

The field of the invention is that of industrial machines for making, for example, domestic refrigerators cells and doors, bag casings or shells, as well as other hydrosanitary and the like articles made starting from a thermoformed sheet-like plastic material.

Conventional on-line thermoforming machines, of the type the present invention relates to, substantially comprise a loading station for loading a sheet-like plastic material (in the form of a plate or a coiled sheet), a heating station for heating the plastic material to its thermoforming temperature, a thermoforming-molding station, as well as a thermoformed material unloading station.

More specifically, the heating stations used in prior thermoforming machines conventionally include a plurality of heating ovens, which can be driven from a working position, inside the machine construction, to a rest or inoperative position, arranged laterally outside of said machine.

Because of the above disclosed construction, prior thermoforming machines have a lateral size which substantially corresponds to the size of the heating ovens and, accordingly, to the width of the on-line machine. Thus, with the heating ovens in their deactuated or off condition, said machine will have a width size substantially corresponding to two times the width of the machine in its operating or working condition.

Because of the above mentioned size, prior on-line thermoforming machines provide to exploit the spaces on the sides of said machines for arranging therein, for example, double loaders for loading the plate or sheet like plastics material, as well as for arranging control centers and the like. Accordingly, the overall construction of the machine is rigidly related to the position of the machine operator (either leftward or rightward with respect to said machine), and this without any possibilities of modifying the original construction and arrangement of the machine and related apparatus.

Thus, said prior thermoforming machines have the drawback that, for transportation purposes, they must be disassembled in several parts of less size, which would involve frequent errors in the reassembling operations, in addition to great labour costs and times for disassembling and assembling again said machines.

SUMMARY OF THE INVENTION

Accordingly, the aim of the present invention is to provide an improved on-line thermoforming machine, in which the above mentioned drawback of the prior art thermoforming machines are overcome.

Within the scope of the above aim, a main object of the present invention is to provide such an on-line thermoforming machine, which has a very reduced side size, which is substantially independent from the operating or not operating condition of the machine.

A further object of the present invention is to provide such a thermoforming machine which is very flexible in operation and which would allow the operator to operate either at a left or at a right position with respect to the machine construction, even as the machine is originally installed.

A further object of the present invention is to provide such a thermoforming machine which can be easily transported, with a very reduced number of handling operations.

According to one aspect of the present invention, the above mentioned aim and objects, as well as yet other objects, which will become more apparent hereinafter, are achieved by an improved on-line thermoforming machine for making molded articles from sheet-line plastic materials, of the type comprising at least a loading station for loading said plastic material, at least a heating station, including heating ovens, for heating said plastic material, a thermoforming station and an unloading station for unloading the thermoformed plastic material, and being substantially characterized in that said sheet-like plastic material heating station comprises a plurality of ovens which, in their deactuated condition, do not cause any increase of the side size of said machine with respect to the size thereof necessary for performing the heating operations.

According to further features of the invention, said ovens are of a type comprising two panel portions which can be mutually closed as the pages of a book, as disclosed and illustrated in the Italian patent application No. MI96A00607 in the name of DE NICHILO Giorgio. These ovens have a oven construction made of two separated portions, respectively a "front" and a "rear" portion, as disclosed and illustrated in a prior Italian patent application No. MI 96A00607 in the name of DE NICHILO Giorgio.

The on-line machine according to the invention, is further characterized in that it comprises a push-button board as well as an electric panel, which can be arranged either on a side or on the other side of said machine.

According to yet further characteristics of the inventive machine, said sheet-like plastic material loading station is provided with tilting side closing doors adapted to allow, in a tilted position thereof, pallets supporting said plastic material sheets or plates to be easily driven. Said doors are moreover provided, on their side facing the inside of the loading station, with a plurality of wheels.

The heating station of the thermoforming machine according to the invention is also provided with side closing tilting doors for closing said stations and which can be opened in order to allow the mold included in said station to be removed and/or replaced.

The subject machine is furthermore characterized in that said machine has a width less than 2 m, both in its heating condition, and in the off condition of the heating ovens. Said sheet-like plastic material is moreover constituted by a plate element or a continuous strip fed from a strip coil.

With respect to conventional on-line thermoforming machine, the inventive thermoforming machine has the advantage of having a width which is substantially a half, since the heating ovens included in the machine heating station do not project laterally from the machine. Accordingly, the subject machine can be transported in an assembled condition, i.e. it is not necessary to disassemble the machine before transportation and assemble it again at the working place, with a great saving in the required labour.

A further advantage directly deriving from the above disclosed features, is that the inventive thermoforming machine has a construction allowing an operator to indifferently operate on the left or on the right side of the machine. Also the inlet and outlet of the mold can be reversed, as well as the inlet and outlet side of the pallet transporting the sheet-like plastic material.

Thus, the inventive machine is much more simple, economic and operatively flexible than prior like machines.

BRIEF DESCRIPTION OF THE DRAWINGS

The invention will be disclosed hereinafter with reference to the figures of the accompanying drawings, illustrating an exemplary and not limitative preferred embodiment thereof. In the drawings.

DESCRIPTION OF THE PREFERRED EMBODIMENT

Figure 1:
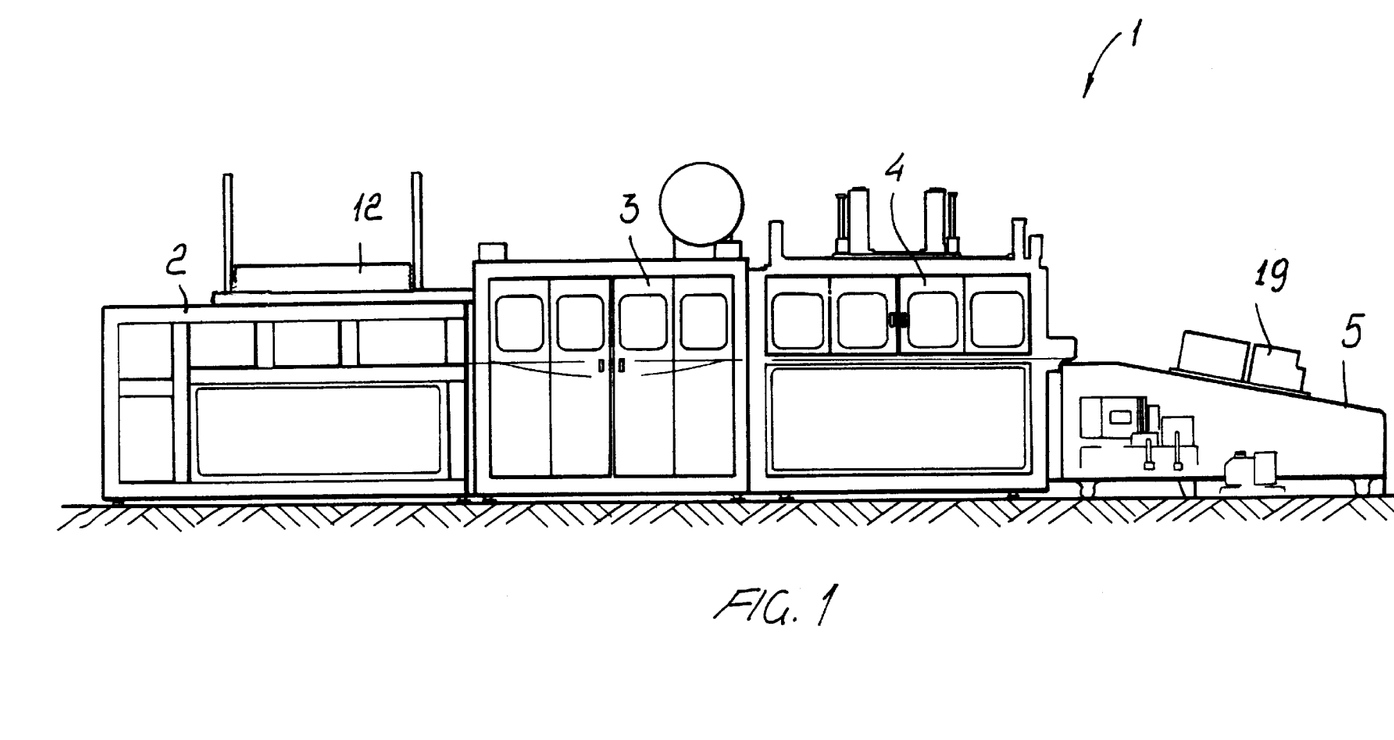
FIG. 1 is a side view illustrating the on-line thermoforming machine according to the invention.
Figure 2:
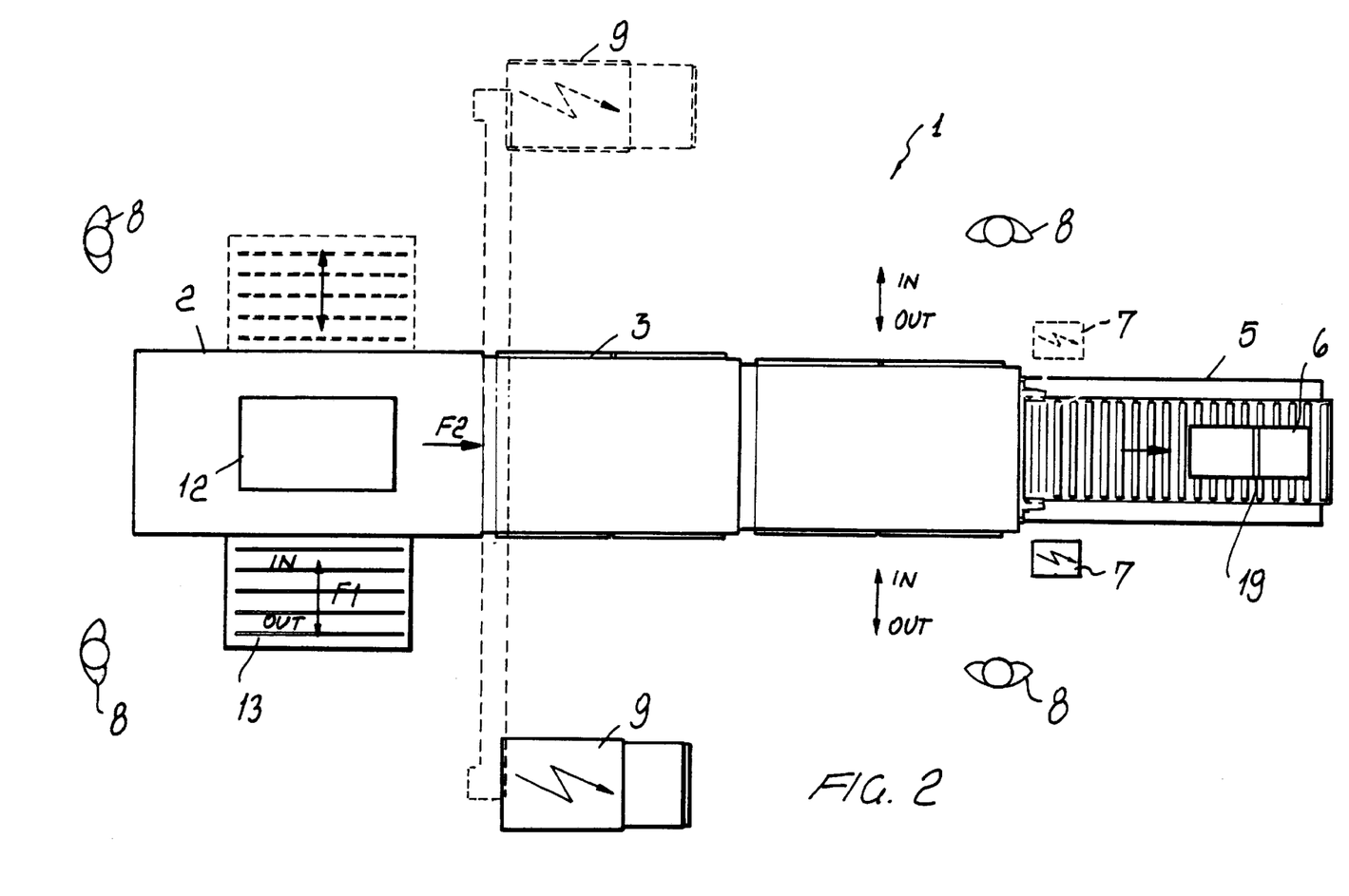
FIG. 2 is a top plan view illustrating the thermoforming machine of FIG. 1.

The on-line thermoforming machine according to the invention has been generally indicated by the reference number 1 in FIG. 1. In the illustrated embodiment, said thermoforming machine comprises a loading station 2 for loading the sheet-like plastic material 12, a heating station 3, a thermoforming station 4 and a unloading station 5. The maximum width 6 of the subject thermoforming machine, in the embodiment shown in FIG. 2, is of a bout 2 m, while providing a molding width of about 1 m.

The machine further comprises a push-button panel 7 which can be indifferently applied or to the right side or to the left side of the machine (as shown by the dashed lines in the Figures). Even the position of the operator 8 and of the electric panel 9 shown in FIG. 2 can be selected at will.

The loading of the plates 12 into the corresponding station 2 is performed starting from the pallets 13 indifferently arranged either on the right or on the left side of the machine 1. The plates 12, in particular, are driven to the station 2 by displacing them as shown by the arrows F1, and then are sent to the subsequent heating station 3 as indicated by the arrow F2 of FIG. 2.

Figure 3:
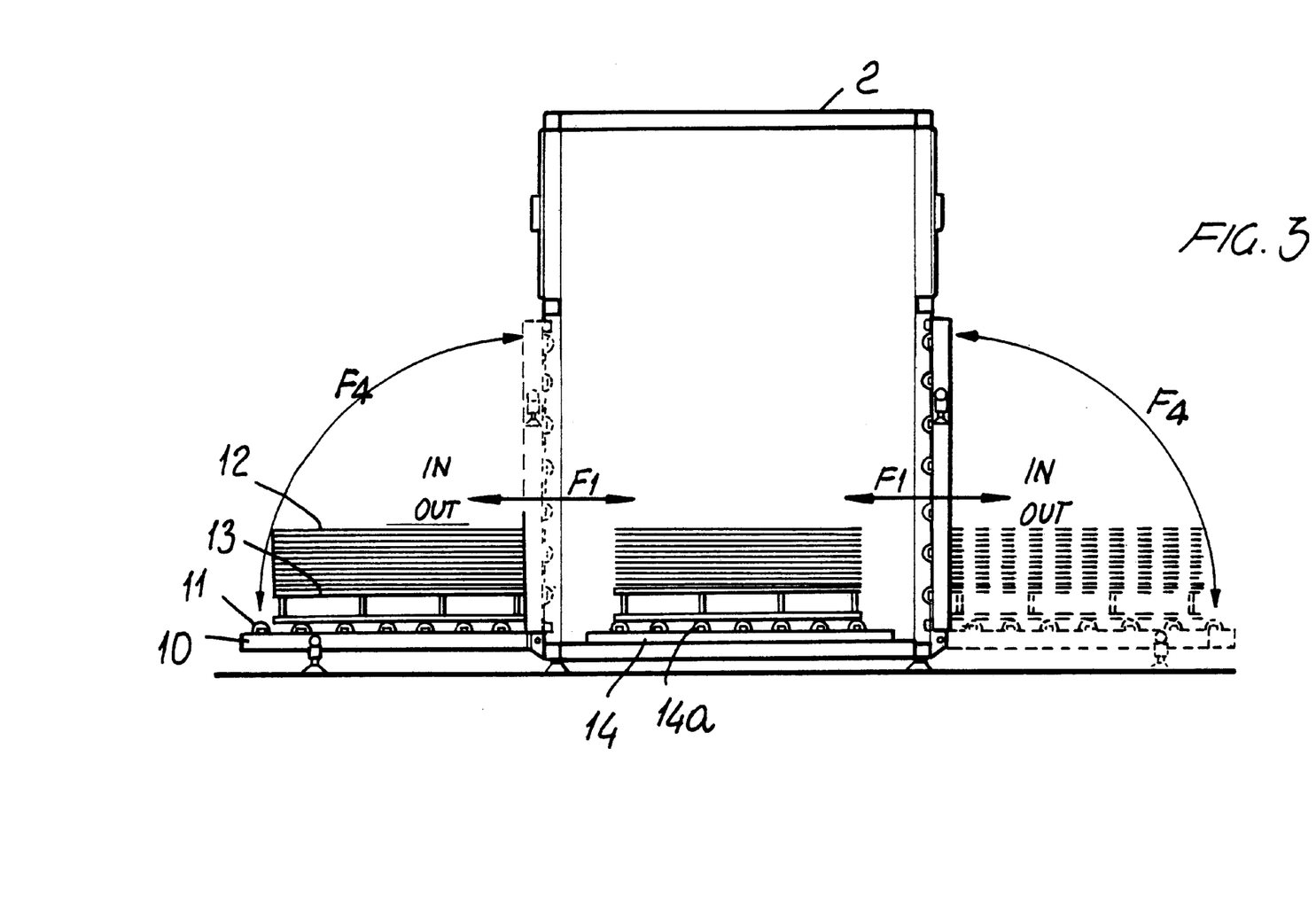
FIG. 3 is a front view illustrating the loading station for loading the sheet-like plastic material in the machine of FIGS. 1.

As is clearly shown in FIG. 3, the sheet-like plastic material loading station 2 is laterally closed by tilting doors 10 provided, on their side 10a facing the station 2, with a plurality of rollers or the like elements 11. With the door 10 tilted in the direction shown by the arrows F4 and horizontally arranged, the rollers 11 are adapted to support the pallets 13 and drive said pallets to said station 2, thereby allowing the plates 12 to be loaded on their related support 14, also provided with rollers 14 (see the arrow F1 of FIG. 3).

Figure 4:
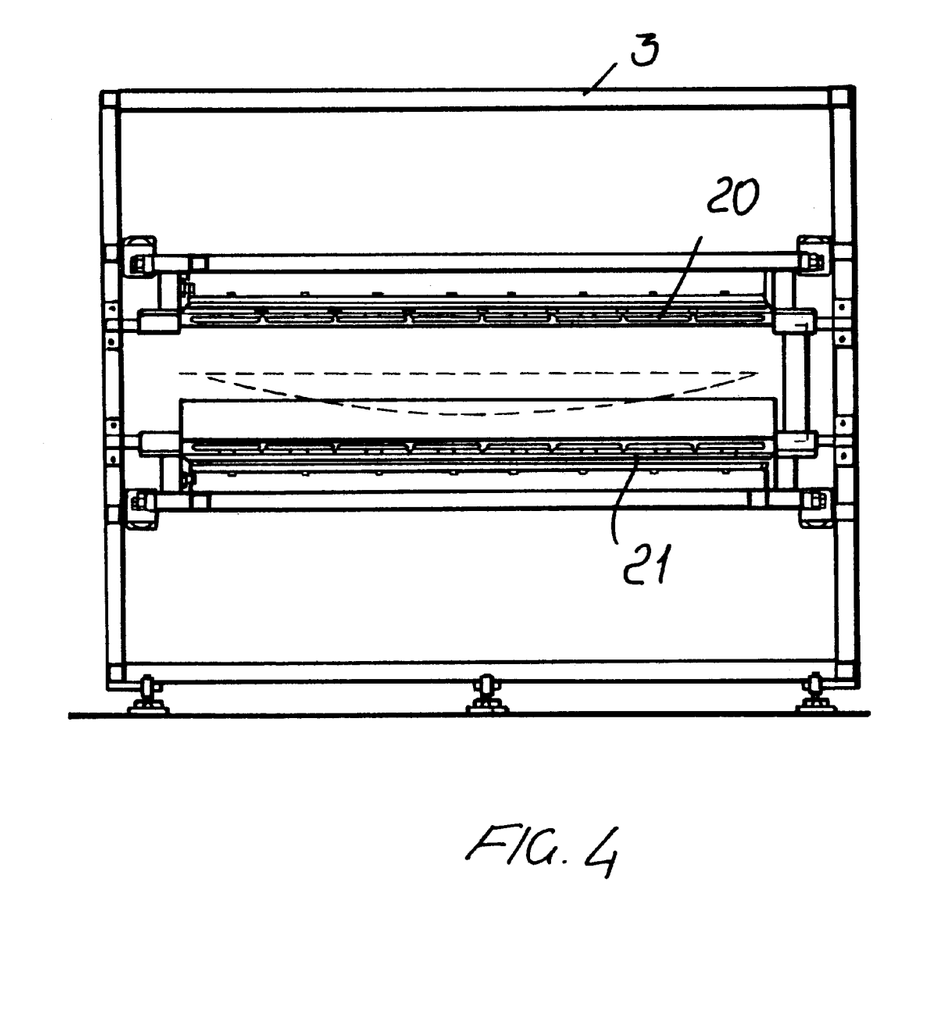
FIGS. 4 and 5 are respectively a side and front view illustrating the heating ovens used in the heating station included in the thermoforming machine of FIG. 1.
Figure 5:
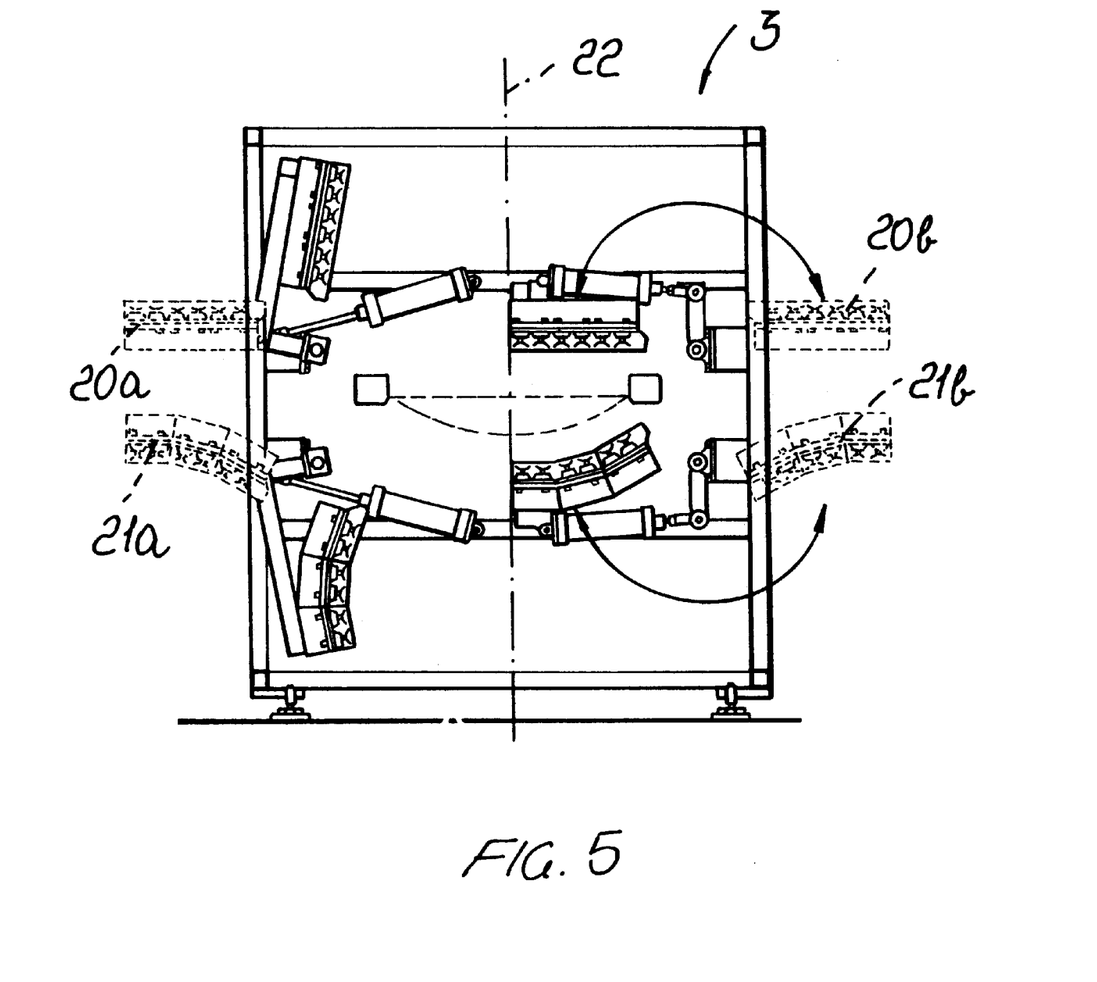

The heating station 3 of the subject thermoforming machine 1 comprises the heating ovens shown in FIGS. 4 and 5. Said heating ovens, in particular, are of the type disclosed in the aforesaid Italian patent application MI96A00607. Said ovens comprise a top panel 20 and a bottom panel 21 (FIG. 4), said bottom panel having an arch or "cradle" shape, thereby fitting the deflection of the plates as they are heated.

Each oven is in turn made by associating two half-panels respectively 20a–20b and 21a–21b pivoted at one of their outer edges and adapted to be closed as a page of a book along the line 22 (middle line) of the respective panel (FIG. 5).

Figure 6:
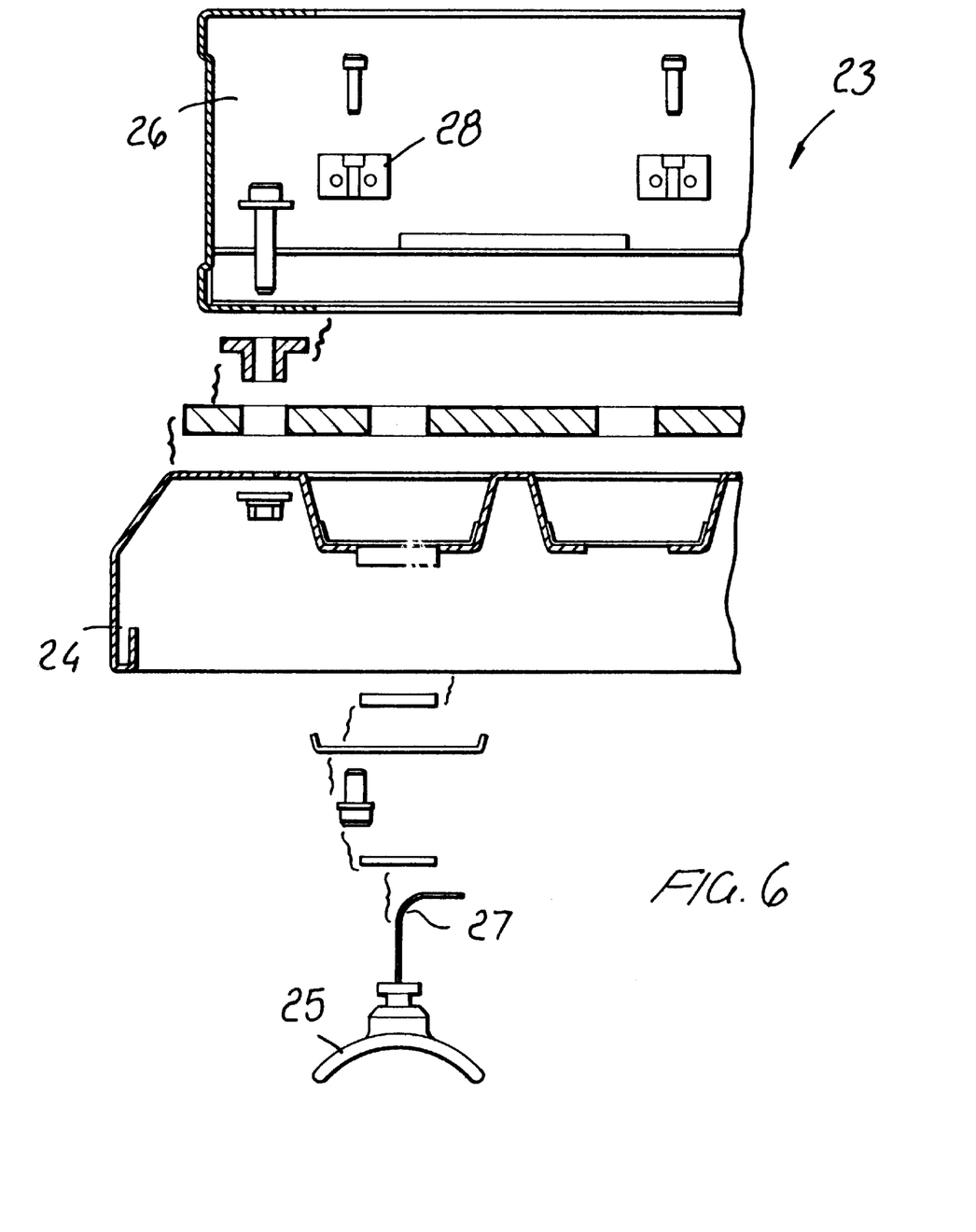
FIGS. 6 and 7 illustrate a detail of the oven construction of FIGS. 4 and 5.
Figure 7:
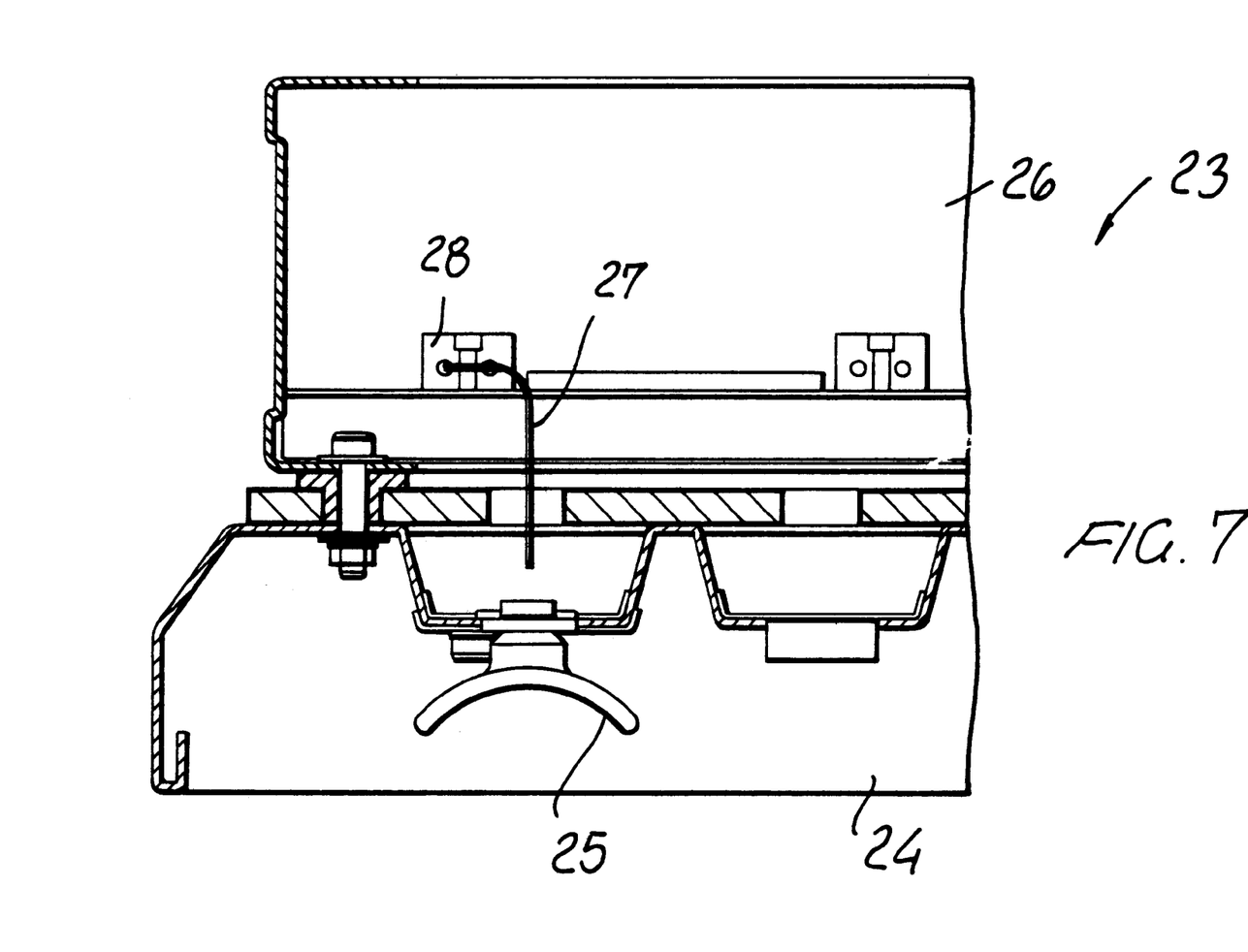

In the preferred embodiment shown in FIGS. 6 and 7, the ovens 20 and 21 comprise a panel 23, which is divided into substantially two portions:

a "front" portion 24, i.e. a portion facing the plastic material to be heated, comprising a metal box-like supporting element supporting a plurality of electric resistances 25; and a "rear" portion 26, i.e. a portion facing the side opposite to the "front" portion 24, and receiving the electric cables 27 coupled to the posts 28 of the electric resistances 25, as well as the further cables (not shown) coupling said posts 28 to the main electric panel.

Further features of the panel 23 shown in FIGS. 6 and 7 are disclosed in the aforesaid Italian patent application No. MI96A00608.

The sheet-like plastic material 12 exiting the heating station 3 is then sent to the thermoforming station 4 proper.

Figure 8:
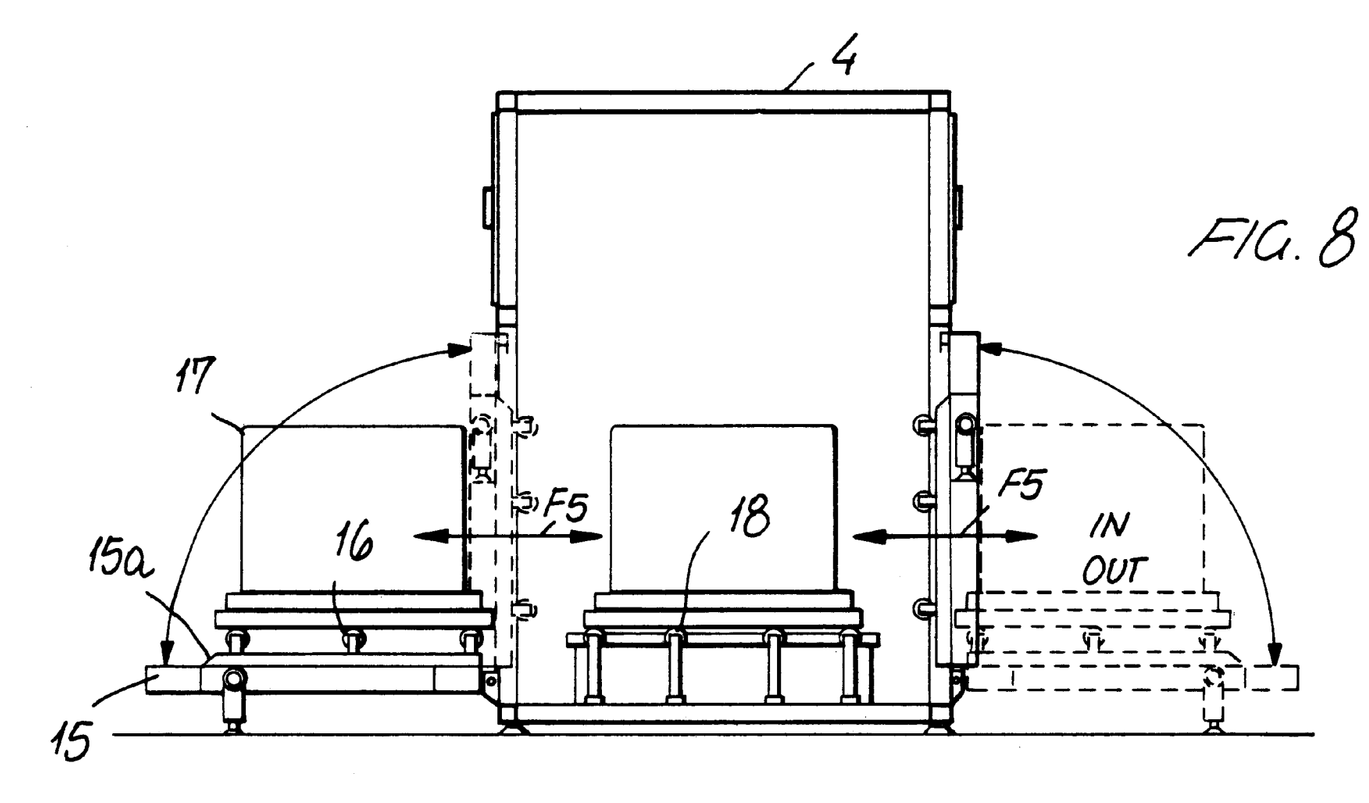
FIG. 8 illustrates a detail of the tilting doors used in the thermoforming station of the machine of FIG. 1.

This latter, which is clearly shown in FIG. 8, comprises a tilting door system 15 which are provided, on their inside portion 15a, with a plurality of wheels 16.

This door arrangement is similar to that already disclosed with reference to the plastic plate loading station 2. The tilting doors 15 have been specifically designed for allowing the mold 17 to be easily withdrawn in the direction of the arrows F5 of FIGS. 2 and 8, said mold 17 being also supported on wheels 18 or for allowing said mold to be replaced as desired.

The thermoformed product 19 exiting the station 4 is then sent, in the direction of the arrow F3 of FIG. 2, to the unloading station 5.

The above disclosed on-line thermoforming machine can be used, for example, in systems for making refrigerator bodies and doors, with middle-high or very high production rates.

What is claimed is:

1. An on-line thermoforming machine for making articles by molding a sheet plastic material, comprising at least a loading station for loading said sheet plastic material, at least a heating station including heating ovens for heating said plastic material, a thermoforming station and a thermoformed plastic material unloading station, wherein said sheet plastic material heating station comprises a plurality of heating ovens, each heating oven having a top heating panel and a bottom heating panel, said bottom heating panel having a cradle shape thereby fitting a deflection of said sheet plastic material being heated, each said top and bottom panel comprising two articulated half panel portions which are swung from an operating position wherein the panel portions are adjacent to one another to a non-operating position wherein the half panel portions are separated, wherein said thermoforming station comprises first side tilting doors provided with a plurality of wheels, said sheet plastic material loading station comprises two opposite sides closed by second side tilting doors which are tilted from a vertical closed position to a horizontal open position for supporting sheet plastic material carrying pallets, said second side tilting doors being provided, on a side thereof facing said loading station with a plurality of pallet bearing sliding rollers.

\* \* \* \* \*